Nov. 8, 1927. 1,648,099
O ZERK, NOW BY JUDICIAL CHANGE OF NAME O. U. ZERK
MEANS FOR LUBRICATING SPRING BOLTS
Filed March 14, 1921
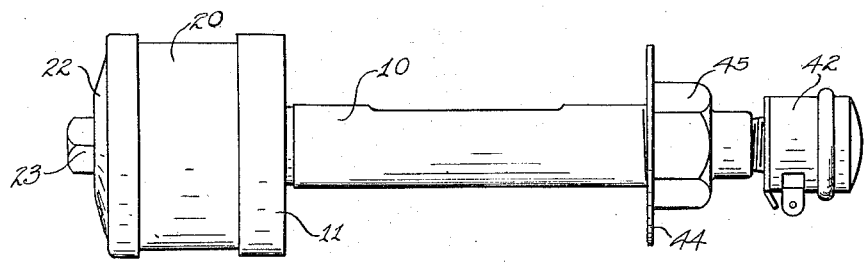
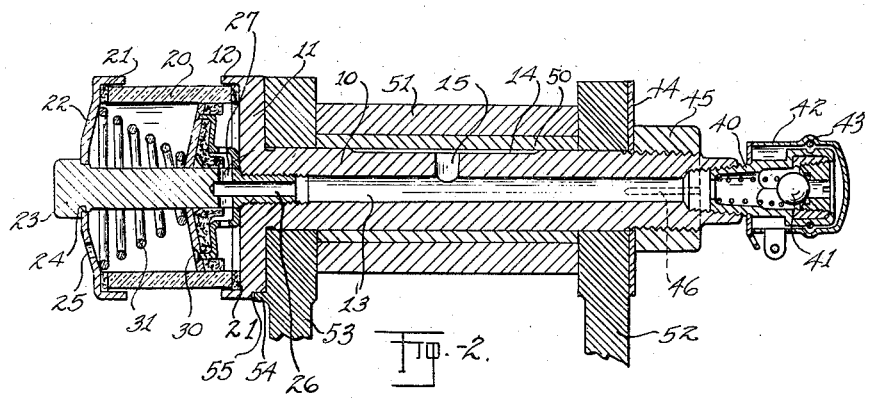
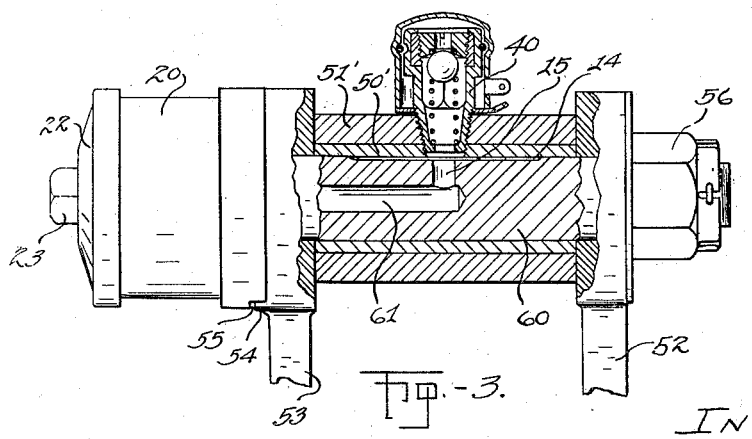
INVENTOR
Oscar Zerk
By Baker & Macklin,
Attys.

Patented Nov. 8, 1927.

1,648,099

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO THE BASSICK MANUFACTURING COMPANY.

MEANS FOR LUBRICATING SPRING BOLTS.

Application filed March 14, 1921. Serial No. 452,131.

My invention relates to a lubricating device.

One object of my invention is a provision of an automatic grease feeding device in which the inlet and outlet openings and passages are both located in front of the piston.

Another object of my invention is to provide a grease or oil cup in which the only threaded members which communicate with the exterior shall be small in diameter. This is a considerable advantage in a grease or oil cup which is made of drawn steel because of the difficulty and expense involved in accurately cutting threads either exteriorly or interiorly on a steel member of large diameter on account of the hardness of the steel.

As further advantages of my device may be mentioned the provision of a grease-feeding device which shall be simple in its construction, readily fillable without disassembling, and adapted to show to the operator at a glance the amount of lubricant therein.

Another object is the provision of a means which may be directly attached to the end of a spring bolt and in which the spring bolt may form a portion of the grease retaining means.

Referring to the drawings in which a device embodying my invention is illustrated, Fig. 1 is a side view of a device in which my invention is embodied; Fig. 2 is a longitudinal section thereof showing a spring connection thereon; Fig. 3 is a side view, parts being broken away and in section, showing a slightly different arrangement from that of the other figures.

Referring to the different parts by numerals, the member 10 is shown as constituting a spring bolt and is provided at one of its ends with the flange 11 and the upturned rib 12 forming the receiving cup. A transparent cylindrical member 20 is adapted to seat in this cup, its other end extending into a cap 22, suitable packing rings 21 being provided at each end of the transparent member to provide a tight seal.

In order to hold these members together in position to form a grease chamber, bolt 23 is provided, which extends through a non-circular central opening in the cap 22 and has a similarly formed non-circular portion 24 engaging this opening. The bolt head abuts the cap and serves to hold it in position. The function of the non-circular opening in the cap and the non-circular portion 24 of the bolt is to prevent accidental loosening of the bolt, for when the bolt has been threaded into the longitudinal opening in the spring bolt 10, it will hold the cap 21 tightly against the packing and, therefore, any turning of the bolt will be resisted by the friction between the packing and cap.

The bolt 23 adjacent its threaded end is provided with a longitudinal opening 26 communicating with the transverse opening 27, whereby a communication is provided from the grease chamber to the interior of the spring bolt 10.

Slidably mounted upon the bolt 23 is a piston 30 having a washer which tightly seals against the sides 20 and the bolt 23. This piston may take the form as illustrated and fully described in my application, Serial No. 452,130 filed March 14, 1921.

A conical helix spring 31 abuts the cap 22 at one end and the piston at the other to create and maintain a pressure within the lubricant containing chamber whereby the lubricant is continuously and automatically fed to the bearing from the lubricant chamber. A vent 25 is formed in the cap 22 to allow the escape of air when the piston is forced backward against the action of the spring when the lubricant chamber is being filled.

The bolt 10 is provided with the groove 14 and a transverse opening 15 which extends from the groove 14 to the longitudinal opening 13. These openings form a communication whereby lubricant may be supplied to the spring shackle from the chamber.

In order to provide a convenient means for filling the chamber, the opening 13 is shown as extending throughout the entire length of the bolt 10 and the end of the bolt may be interiorly threaded to receive the nipple of the inlet member 40. This member includes a check valve 41 adapted to allow the inward passage of grease but to prevent its escape. This member is shown as provided with the dust-cap 42 and the expansion spring 43 adapted to retain the dust-cap in position.

As the special construction of this device forms no part of the present invention, a further detailed description of it is omitted, as any suitable form of check-valve mechanism might be employed. The form here shown is shown and claimed by me in my co-pending application, Serial No. 452,132 filed March 14, 1921, Patent No. 1,604,442, granted October 26, 1926.

The bolt 10 is shown as having the exterior threads adapted to receive the retaining washer 44 and nut 45 for abutting and holding in position the shackle. If desired, an ordinary form of slot 46 may be provided in the bolt 10 for use with a lock washer to securely hold the nut and shackle in position.

I have shown in Fig. 2, the bolt in position on a spring. The bolt is provided with the beading and groove 14 and I show in place thereon the ordinary bronze bushing 50, the end of the automobile spring 51 surrounding this bushing. I also show in place, the spring shackles or toggles 52 and 53. I prefer to provide the shackle 53 with a flange 54, which is adapted to seat in a slot 55 in the flange 11 of the bolt 10. The flange then prevents turning of the spring bolt 10 so as to hold the openings 15 and the groove 14 in proper relation to the spring.

In Fig. 3 I have illustrated a slightly different form of spring bolt 60 which may be employed. This bolt has the outlet opening 15 and the groove 14 as in the other case but the longitudinal opening 61 does not extend throughout the length of the bolt. The end of the bolt is threaded to receive a suitable holding means such as the castellated nut 56 for holding the spring, the shackles and the bushing.

In this construction I employ the openings 15, both as the outlet opening and the inlet opening through which lubricant is forced into the grease chamber and for this purpose I form threads in the spring 51′ and the bushing 50′ and secure the nipple 40 therein. This nipple 40 and the other parts of the structure may be the same as in Fig. 2 and require no further description.

It will be apparent from the foregoing description that in both of the forms illustrated, grease may be forced into the grease chamber through the inlet member 40 by means of a grease gun or the like, and this grease will force the piston 30 outward from the position shown in Fig. 2. The lubricant in the chamber will then be continually forced outward from the chamber by the action of the spring 31 to feed the grease to the spring shackles through the opening 15 and groove 14.

It will, therefore, be apparent that as long as a sufficient supply of grease remains in the chamber to hold the piston away from the final position shown in Fig. 2, the spring 31 will maintain a steady feed of lubricant to the shackle. It will also be seen that the devices illustrated may be readily supplied with lubricant without disassembling thereof.

While I have shown the members 10 and 60 as comprising spring bolts, it should be understood that these members may comprise merely an end member for a lubricant chamber having an inlet and outlet opening.

While I have described a specific embodiment of my invention, it will be apparent that many other devices embodying the principles thereof might be made. Therefore, the foregoing description should be taken as illustrative rather than as restrictive of the character and scope of the invention.

Having thus described my invention, I claim:—

1. A device of the class described, including, a hollow spring bolt having a flange at one end forming an end of a lubricant chamber, a cap forming the other end of said chamber, an intermediate member between said ends forming the side of said chamber, a bolt extending through said cap and threaded in said spring bolt to hold said parts together, the shank of said bolt having a passage therein establishing communication between the interior of said chamber and the interior of said hollow bolt, and means for creating pressure on the lubricant in said chamber.

2. A device of the class described, including, a hollow spring bolt having a flange at one end forming an end of a lubricant chamber, a cap forming the other end of the chamber, an intermediate member between said ends forming the side of said chamber, a bolt extending through said cap and threaded in said spring bolt to hold the parts of said chamber together, the shank of said bolt having a longitudinal passage therein in communication with said chamber and said hollow bolt.

3. In a device of the class described, two end members forming the ends of the grease chamber, said end members having central apertures therethrough, and a bolt extending through the aperture in one of the end members and threaded into the aperture in the other end member to hold said members together, said bolt having a longitudinally extending passage through its threaded end and having a transversely extending passage therethrough intermediate said end members and in communication with the longitudinal passage therein.

4. The device of the class described, including, two end members forming the ends of the lubricant chamber, a transparent member between said ends forming the side of said chamber, a bolt threaded in one of said ends and abutting the other end to hold said members together, said bolt having a passage therein extending through its threaded end and in communication with the interior of said chamber, and means including a piston in said chamber for feeding lubricant therefrom.

5. A device of the class described, including, a spring bolt having a flange at one end, forming one end of a lubricant chamber, a cap forming the other end of said chamber, an intermediate member between said ends forming the side of said chamber, a bolt extending through said cap and threaded in said spring bolt to hold said parts together, the shank of said spring bolt having a passage therein with inlet and outlet openings, said passage connecting with said chamber, and means for creating pressure on the lubricant in said chamber.

6. A device of the class described, including, a hollow bolt having an end member provided with a flange, a rib on said flange, a cap, a transparent member seated at one end on said flange within said rib and at its outer end on said cap, a bolt extending through said cap, the bolt having a shoulder abutting said cap and threaded in said spring bolt intermediate the member between said bolt and cap, said members forming a lubricant chamber, said bolt having a passage through its threaded end in communication with the interior of said chamber, means for creating pressure upon the grease in said chamber, and means for filling said chamber with grease.

7. Lubricating means comprising two elements having relative movement and co-operating surfaces to be lubricated, said elements having lubricant passageways communicating with said surfaces and opening externally at different points, external lubricant storage means at one of said points on one element, resilient means therein for feeding lubricant to said surfaces, and an inlet check valve at another point on the other element through which said storage means is adapted to be filled.

8. In a lubricating arrangement, a first cylindrical member, a second member encircling said first member and rotatable thereon, said members having contact surfaces, an oil passage opening at one end of said first cylindrical member and communicating with the contacting surfaces of said members, a second oil passage in said second member and communicating with said first passage, said second passage also opening externally, external lubricant storage means at one of said openings, resilient means therein for feeding lubricant to said contacting surfaces, and an inlet check valve at the other opening through which said storage means is adapted to be filled.

In testimony whereof, I hereunto affix my signature.

OSCAR ZERK,
*Now by Judicial Change of Name Oscar Ulysses Zerk.*